United States Patent
Oh et al.

(10) Patent No.: US 10,148,178 B2
(45) Date of Patent: Dec. 4, 2018

(54) SYNCHRONOUS BUCK CONVERTER WITH CURRENT SENSING

(71) Applicant: Apple Inc., Cupertino, CA (US)

(72) Inventors: InHwan Oh, Cupertino, CA (US); Manisha P. Pandya, Saratoga, CA (US); Behzad Mohtashemi, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/646,035

(22) Filed: Jul. 10, 2017

(65) Prior Publication Data

US 2018/0091054 A1 Mar. 29, 2018

Related U.S. Application Data (60) Provisional application No. 62/399,038, filed on Sep. 23, 2016, provisional application No. 62/399,194, filed on Sep. 23, 2016.

(51) Int. Cl.
*H02M 3/158* (2006.01)
*H02M 1/08* (2006.01)
*H02M 1/00* (2006.01)

(52) U.S. Cl.
CPC .......... *H02M 3/158* (2013.01); *H02M 1/083* (2013.01); *H02M 3/1588* (2013.01); *H02M 2001/0009* (2013.01)

(58) Field of Classification Search
CPC ................ H02M 3/158; H02M 1/083; H02M 2001/0009
See application file for complete search history.

(56) References Cited

U.S. PATENT DOCUMENTS

| | | | |
|---|---|---|---|
| 4,628,284 A | 12/1986 | Bruning | |
| 4,866,367 A | 9/1989 | Ridley | |
| 6,728,117 B2 | 4/2004 | Schemmann et al. | |
| 7,342,362 B2 | 3/2008 | Lin | |
| 7,426,120 B2 | 9/2008 | Yang | |
| 7,479,773 B2 * | 1/2009 | Michishita | H02M 3/1588 323/222 |
| 7,492,135 B2 * | 2/2009 | Saeki | H02M 3/1588 323/246 |
| 7,675,275 B2 | 3/2010 | Ruobiao et al. | |

(Continued)

FOREIGN PATENT DOCUMENTS

WO    WO 13/182844    12/2013

OTHER PUBLICATIONS

U.S. Appl. No. 15/386,340, filed Dec. 21, 2016, Oh.
(Continued)

*Primary Examiner* — Emily P Pham
(74) *Attorney, Agent, or Firm* — Brownstein Hyatt Farber Schreck, LLP (57) ABSTRACT

A power converter includes a buck converter with a low-side switch. During a discharge mode, current passes through the low-side switch to form a current loop. The low-side switch is typically closed synchronously with the opening of a high-side switch coupled to an input voltage level to the buck converter. The power converter also includes a high-side controller and a low-side controller, which together are configured to adjust the timing of the operation mode of the high-side controller between a storage mode and the discharge mode.

20 Claims, 8 Drawing Sheets

(56) References Cited

U.S. PATENT DOCUMENTS

| | | |
|---|---|---|
| 7,911,813 B2 | 3/2011 | Yang et al. |
| 7,982,548 B2 | 7/2011 | Athas |
| 8,077,487 B2 | 12/2011 | Huynh |
| 8,125,799 B2 | 2/2012 | Zhu et al. |
| 8,587,964 B2 | 11/2013 | Yang |
| 8,699,299 B2 | 4/2014 | Horsky et al. |
| 8,803,563 B2 | 8/2014 | Deng et al. |
| 8,842,450 B2 | 9/2014 | Jungreis |
| 8,917,068 B2 | 12/2014 | Chen et al. |
| 9,030,131 B2 | 5/2015 | Kado et al. |
| 9,048,739 B2 | 6/2015 | Shoji et al. |
| 9,124,184 B2 | 9/2015 | Sato et al. |
| 9,154,038 B2 | 10/2015 | Fang et al. |
| 9,166,481 B1 | 10/2015 | Vinciarelli et al. |
| 9,214,850 B2 | 12/2015 | Deng et al. |
| 9,252,676 B2 | 2/2016 | Yang et al. |
| 9,389,617 B2 | 7/2016 | Dally |
| 9,402,287 B2 | 7/2016 | Sasaki |
| 9,444,357 B1 | 9/2016 | Matthews |
| 9,461,558 B2 | 10/2016 | Bianco et al. |
| 9,479,063 B2 | 10/2016 | Pan |
| 9,484,803 B2 | 11/2016 | Turchi |
| 9,490,716 B2 | 11/2016 | Tseng et al. |
| 9,621,053 B1 | 4/2017 | Telefus |
| 9,722,497 B2 | 8/2017 | Fang |
| 9,871,451 B2 | 1/2018 | Lin et al. |
| 2016/0072393 A1 | 3/2016 | McIntyre |
| 2016/0099660 A1 | 4/2016 | Khaligh |
| 2016/0118894 A1 | 4/2016 | Zhang et al. |
| 2016/0268899 A1* | 9/2016 | Rader .................. H02M 3/156 |
| 2018/0004240 A1 | 1/2018 | Gritti et al. |
| 2018/0041073 A1 | 2/2018 | Oh |
| 2018/0041116 A1 | 2/2018 | Oh |
| 2018/0083490 A1 | 3/2018 | Oh et al. |

OTHER PUBLICATIONS

U.S. Appl. No. 15/387,329, filed Dec. 21, 2016, Oh.
U.S. Appl. No. 15/476,652, filed Mar. 31, 2017, Oh et al.
Choi et al., "A Novel Bridgeless Single-Stage Half-Bridge AC/DC Converter," Virginia Polytechnic Institute and State University, Future Energy Electronics Center, Blacksburg, Virginia, 2010, 5 pages.
U.S. Appl. No. 15/711,182, filed Sep. 21, 2017, Oh et al.

* cited by examiner

SYNCHRONOUS BUCK CONVERTER WITH CURRENT SENSING

CROSS-REFERENCE TO RELATED APPLICATION(S)

The application claims the benefit under 35 U.S.C. § 119(e) of U.S. Provisional Patent Application No. 62/399,038, filed on Sep. 23, 2016, and entitled "Synchronous Buck Converter with Current Sensing" and U.S. Provisional Patent Application No. 62/399,194, filed on Sep. 23, 2016, and entitled "Synchronous Buck Converter with Current Sensing" each of which is incorporated by reference as if fully disclosed herein.

FIELD

Embodiments described herein generally relate to power converters and, in particular, to systems and methods for reducing conduction losses in power converters.

BACKGROUND

An electronic device can receive electric power from a power source. The electronic device can include a power conversion and/or regulation circuit to change one or more characteristics of power received from the power source into a form usable by one or more components of the electronic device. In many examples, the power conversion and/or regulation circuit includes a power converter, such as a buck converter, boost converter, or a boost-buck converter.

Many conventional power converters include one or more diodes that exhibit a voltage drop when in forward conduction mode. This voltage drop results in power loss (e.g., conduction loss) that reduces the operational efficiency of the power converter.

SUMMARY

Embodiments described herein generally reference a power converter including a step-down voltage converter. The step-down voltage converter can include a tank inductor, an output capacitor and a voltage-controlled switch. Typically, the voltage-controlled switch is coupled in series with the tank inductor to selectively couple the tank inductor to an input voltage signal. The voltage-controlled switch receives a switching signal from a state controller. In response to the switching signal, the voltage-controlled switch connects or disconnects the tank inductor from the input voltage signal.

The power converter can also include a second voltage-controlled switch that selectively couples the output capacitor to the tank inductor. The second voltage-controlled switch receives a different switching signal from a second state controller. In response to the second switching signal, the second voltage-controlled switch connects or disconnects the tank inductor from the output capacitor.

The power converter also includes current monitoring circuitry that selectively switches the state of the first voltage-controlled switch and the state of the second voltage-controlled switch based on a measurement of current through the tank inductor. In some embodiments the second voltage-controlled switch is turned off when current through the tank inductor falls below a threshold.

Other embodiments described herein reference a power converter disposed within a housing of an electronic device. The power converter includes a buck converter formed with a MOSFET (e.g., high-side MOSFET) connected in series with a tank inductor forming a first current loop. A second MOSFET (e.g., a low-side MOSFET) is connected in series with the tank inductor forming a second current loop. A first current monitoring circuit is associated with a first current through the tank inductor when the high-side MOSFET is in an on-state and the second MOSFET is in an off-state (e.g., the buck converter is in a storage mode). A second current monitoring circuit is associated with a second current through the tank inductor when the low-side MOSFET is in an on-state and the high-side MOSFET is in an off-state (e.g., the buck converter is in a discharge mode).

Still further embodiments described herein reference a method of reducing voltage in a power converter. The method includes the operations of receiving a voltage at an input of a buck converter defined by a tank inductor and a voltage-controlled switch and monitoring current through the tank inductor. Upon determining that current through the tank inductor has reached or crossed a predetermined value, the voltage-controlled switch is opened and a second voltage-controlled switch is closed. The opening of the first voltage-controlled switch disconnects the input from the tank inductor, and the closing of the second voltage-controlled switch passes current through the tank inductor.

BRIEF DESCRIPTION OF THE DRAWINGS

The disclosure will be readily understood by the following detailed description in conjunction with the accompanying drawings, wherein like reference numerals designate like structural elements.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, they are intended to cover alternatives, modifications, and equivalents as can be included within the spirit and scope of the described embodiments as defined by the appended claims.

Embodiments described herein reference systems and methods for operating a power converter in a manner that efficiently converts one or more characteristics of electric power received from an electric power source (more generally, "power source"). More specifically, the power converter can be configured to receive unregulated or otherwise noisy voltage (herein, the "input voltage" or the "input voltage level") into a regulated voltage level (herein, the "output voltage"). For example, the power converter can be configured to regulate mains voltage (e.g., 90 VAC-265 VAC at 50-60 Hz) to a level such as 3.3 VDC, 5.0 VDC, 12 VDC, 50 VDC or any other suitable voltage.

In many embodiments, the power converter includes at least one buck converter (or other suitable step-down voltage converter) operated at a duty cycle selected to reduce the input voltage level to the output voltage level. The buck converter includes a tank inductor, an output capacitor, and at least one voltage-controlled switch. The output of the buck converter is coupled to a load, such as an electronic device. A feedback circuit (e.g., a compensation network) can be interposed between the buck converter and the load, although the feedback circuit may not be shown in all embodiments. The feedback circuit may be used to regulate the output voltage level in response to changes in the power consumption of the load and/or in response to changes in the input voltage level. In some embodiments, the buck converter can be operated with peak current control in order to provide overcurrent protection to the load, although this may not be required.

For many embodiments described herein, the buck converter is configured for synchronous operation. More specifically, the buck converter is implemented with a voltage-controlled switch (e.g., a MOSFET) in the place of a conventional return diode. In other words, a buck converter such as described herein includes two voltage-controlled switches arranged in a bridge configuration. Herein, these switches are referred to as a "high-side switch" and a "low-side switch" respectively, the low-side switch replacing the conventional return diode. The voltage-controlled switches are configured to alternate the buck converter between a "storage mode" (in which energy is stored in the tank inductor and/or the output capacitor), and a "discharge mode" (in which energy is discharged from the tank inductor and/or the output capacitor).

When in the storage mode, the high-side switch is closed (i.e., conducting current) and the low-side switch is open (i.e., not conducting current). In this configuration, the buck converter couples the input voltage level to the load through the tank inductor, defining a first current loop. Similarly, when in the discharge mode, the high-side switch is opened (i.e., not conducting current) and the low-side switch is closed (i.e., conducting current). In this configuration, the buck converter decouples the input voltage level from the load, coupling a ground reference of the load back to the tank inductor, defining a second current loop. In the discharge mode, energy stored in one or both the tank inductor and/or output capacitor is discharged into the load.

In many embodiments described herein, the high-side switch is coupled to a current-monitoring controller which is referred to herein as a "high-side controller." Similarly, the low-side switch is coupled to a current-monitoring controller which is referred to herein as a "low-side controller." The high-side controller provides high-side peak-current control to the buck converter by detecting current through the high-side switch (e.g., measuring voltage across a resistor in series with the high-side switch). The low-side controller detects a condition, namely, when the tank inductor current starts to flow into a body diode of the low side switch. The low-side controller may detect this condition, for example, by measuring a voltage across the low side switch. When the condition occurs, the low-side controller turns on the low side switch and reduces or minimizes a voltage drop across the body diode of the low-side switch. The low-side controller further detects the condition when current through the tank inductor reaches zero to trigger the time at which the high-side switch should be turned on for a subsequent cycle.

As a result of this topology, a buck converter such as described herein can operate in the same manner as a conventional buck converter without the conduction losses associated with the use of the conventional return diode. Further, a buck converter such as described herein can efficiently operate with input voltage that is substantially higher than the output voltage. Conversely, a conventional return diode of a conventional buck converter experiences increased conduction losses and voltage stress effects as the input voltage level increases.

These and other embodiments are discussed below with reference to FIGS. 1A-6. However, those skilled in the art will readily appreciate that the detailed description given herein with respect to these figures is for explanation only and should not be construed as limiting.

Figure 1A:
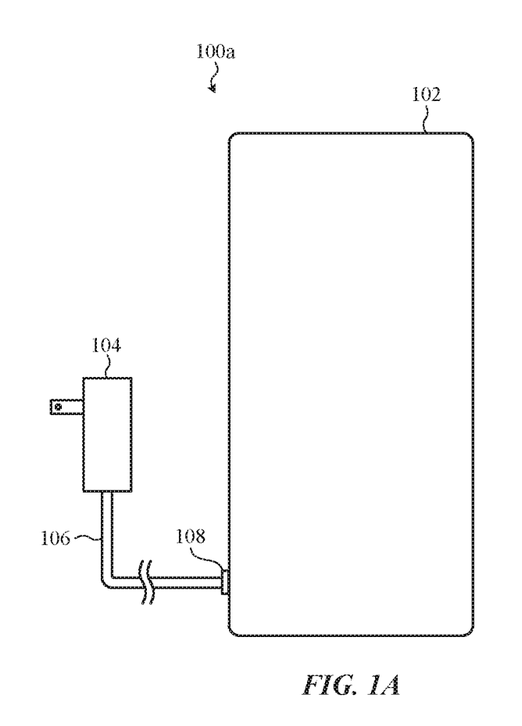
FIG. 1A is a simplified depiction of an electronic device coupled to a stand-alone power converter.
Figure 1B:
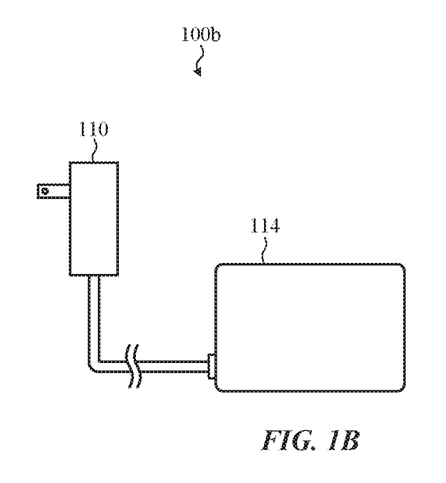
FIG. 1B depicts a stand-alone power converter configured for use with a wireless power transfer system.
Figure 1C:
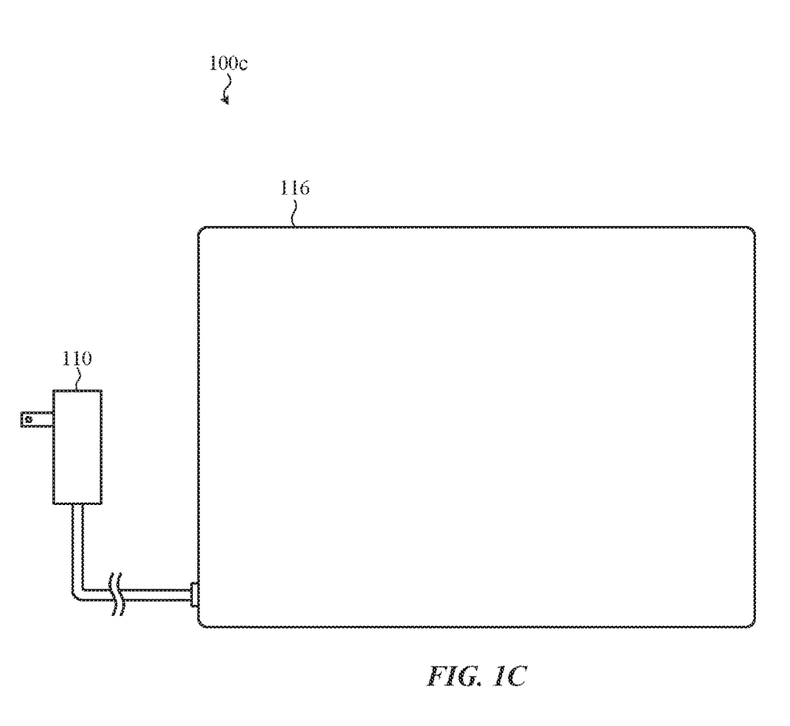
FIG. 1C depicts another stand-alone power converter configured for use with a wireless power transfer system.

Generally and broadly, FIGS. 1A-1C depict various simplified profiles of electronic devices that may incorporate, or may be associated with or coupled to, one or more power converters such as described herein. It will be appreciated, however, that the depicted examples are not exhaustive; the various embodiments described with reference to FIGS. 1A-1C may be modified or combined in any number of suitable or implementation-specific ways.

For example, FIG. 1A depicts an electronic device coupled to a stand-alone power converter configured to change one or more characteristics of power received from a power source into a form usable by the electronic device.

More particularly, the electronic device 100*a* includes a housing 102 to retain, support, and/or enclose various components of the electronic device 100*a* such as a rechargeable battery (not shown). The electronic device 100*a* can also include a processor, memory, power converter and/or battery, network connections, sensors, input/output ports, acoustic elements, haptic elements, digital and/or analog circuits for performing and/or coordinating tasks of the electronic device 100*a*, and so on. For simplicity of illustration, the electronic device 100*a* is depicted in FIG. 1A without many of these elements, each of which may be included, partially and/or entirely, within the housing 102 and may be operationally or functionally associated with the internal battery.

In one example, the internal battery of the electronic device 100a can be recharged by physically connecting the electronic device 100a to a power converter 104. More specifically, a power cable 106 can provide a direct electrical connection between the power converter 104 and the electronic device 100a. In some cases, the power cable 106 is connected to the electronic device 100a via a connector 108.

In these embodiments, the power converter 104 can be configured to accept power at mains voltage and output that power in a form usable by one or more circuits configured to facilitate recharging of the internal battery. In one particular example, the power converter 104 accepts 120 VAC as input and outputs 5 VDC, which can be accepted by the electronic device 100a and used to recharge the internal battery. More broadly, the power converter 104 can be configured to accept high-voltage AC and can be configured to output a lower-voltage DC.

In another example, the power converter 104 can be configured to accept power at mains voltage and output that power in a form that is subsequently converted again by the electronic device 100a prior to being used to charge the internal battery. More specifically, in this example, the power converter 104 can be configured to accept 120 VAC as input and can be configured to output 50 VDC. In these examples, the power converter 104 may also include an inverter (not shown). Thereafter, the electronic device 100a can accept 50 VDC and further convert, by a second power converter within the electronic device 100a, to 5 VDC.

More broadly, the power converter 104 can be configured in this example to accept high-voltage AC and can be configured to output lower-voltage DC. In addition, the second power converter (which can be enclosed within the housing 102) can be configured to accept relatively high-voltage DC and can be configured to output low-voltage DC.

It may be appreciated that the limited examples provided above are not exhaustive. For example, the power converter 104 may be configured to perform an AC-to-AC or AC-to-DC conversion to different voltages than those provided above. Similarly, a power converter enclosed within the housing of the electronic device 100a may be appropriately configured to provide AC-to-AC, AC-to-DC, DC-to-AC, or DC-to-DC conversion.

It may be appreciated that the electronic device 100a can be any suitable electronic device that is either stationary or mobile, taking a larger or smaller form factor than illustrated. For example, in certain embodiments, the electronic device 100a can be, without limitation: a laptop computer; a tablet computer; a cellular phone; a wearable device; a health monitoring device; a personal or commercial automation device; a personal or commercial appliance; a craft or vehicle entertainment control, power, and/or information system; a navigation device; and so on.

In still further embodiments, a power converter (such as the power converter 104) can be configured to operate with an inductive or resonant wireless power transfer system. For example, FIG. 1B depicts a stand-alone power converter, identified as the power converter 100b, configured to change one or more characteristics of power received from a power source into a form that may be wirelessly transferred to an electronic device (not shown). In this example, the power converter 100b can be configured to convert alternating current received via a connector end 110 into alternating current (at the same or different frequency) that can be used by a transmitter end of the power converter 100b to generate one or more time-varying magnetic fields that can be used to wirelessly transfer power to an electronic device placed on or near the transmitter end. In this example, the power converter 100b can directly convert alternating current at one frequency and peak-to-peak voltage into alternating current at a second frequency and peak-to-peak voltage. In this manner, the power converter 100b may operate more efficiently; an intermediate conversion to direct current is not required.

Another example of an inductive or resonant wireless power transfer system is depicted in FIG. 1C. More specifically, a power converter 100c can be configured to change one or more characteristics of power received from a power source into a form that may be wirelessly transferred to more than one electronic device is illustrated. As with the example described above, the power converter 100c can be configured to convert alternating current received via a connector end 110 into alternating current (at the same or different frequency) that can be used by a transmitter end of the power converter 100c to generate one or more time-varying magnetic fields that can be used to wirelessly transfer power to multiple electronic devices each placed on or near the transmitter end. In this example, the power converter 100c directly converts alternating current at one frequency and peak-to-peak voltage into alternating current at a second frequency and peak to peak voltage. In this manner, and as noted with respect to some embodiments described herein, the power converter 100c may operate more efficiently; an intermediate conversion to direct current is not required.

The foregoing embodiments depicted in FIGS. 1A-1C and the various alternatives thereof and variations thereto are presented, generally, for purposes of explanation, and to facilitate an understanding of various possible electronic devices or accessory devices that can incorporate, or be otherwise coupled to, one or more power converters such as described herein. More specifically, FIGS. 1A-1C are presented to illustrate that a power converter such as described herein can be incorporated, either entirely or partially, into the housing of an electronic device, into a separate power accessory that couples to an electronic device via a cable, into a separate power accessory that provides wireless power to one or more electronic devices, and so on.

Figure 2:
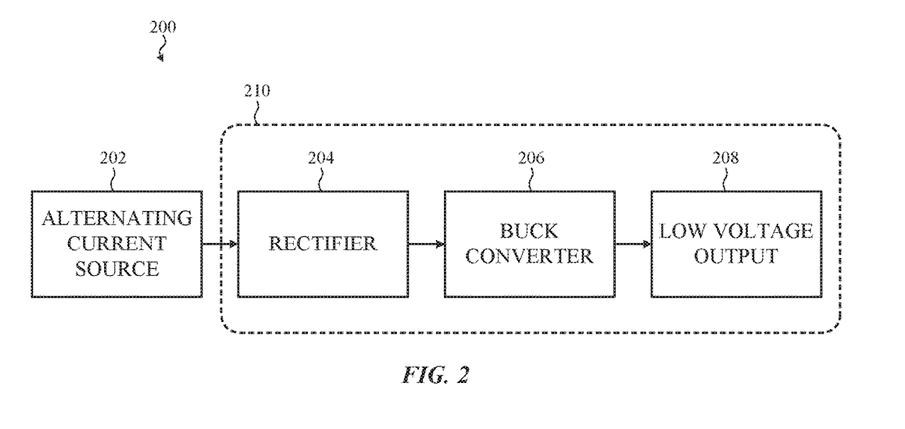
FIG. 2 is a simplified system diagram of a power converter that incorporates a step-down voltage converter (e.g., buck converter) such as described herein.
Figure 3:
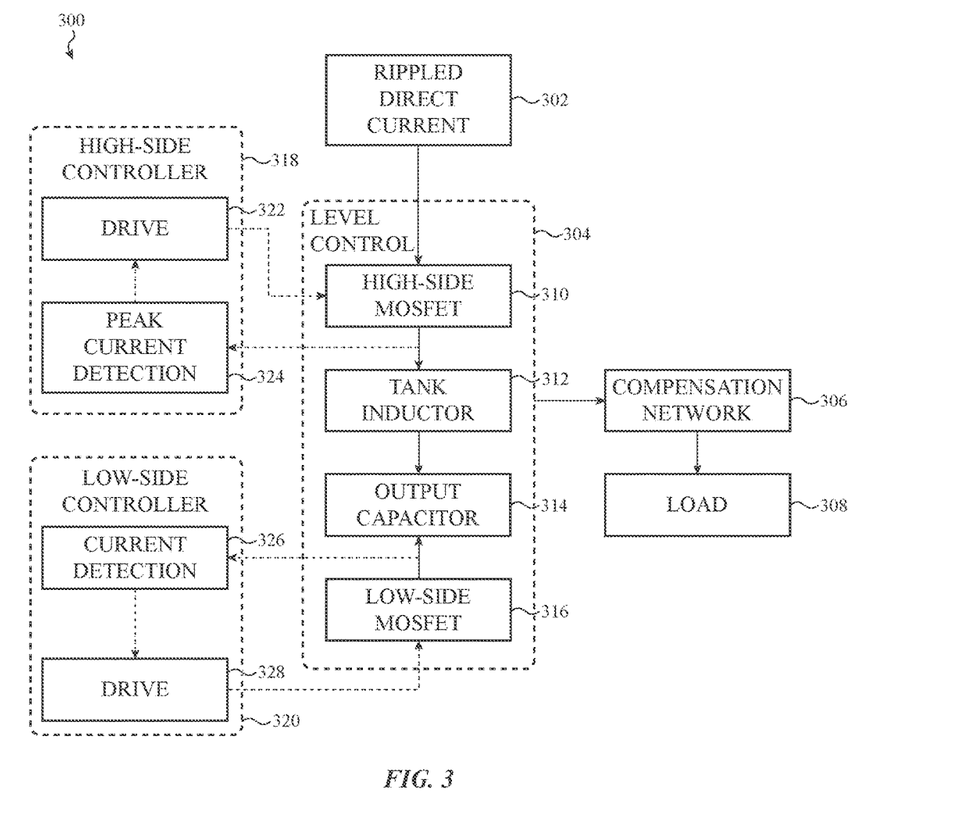
FIG. 3 is a simplified system diagram of a power converter that incorporates a step-down voltage converter, a high-side controller, and a low-side controller, such as described herein.

Generally and broadly, FIGS. 2-3 reference a power converter that may be incorporated within, coupled to or otherwise associated with, an electronic device or stand-alone power converter such as the electronic devices and/or stand-alone power converters depicted in FIGS. 1A-1C.

For example, FIG. 2 depicts a simplified system diagram of a power converter that incorporates a step-down voltage converter such as described herein. The power converter 200 can be configured to accept power from an alternating current power source 202.

The alternating current power source 202 can deliver alternating current with any suitable amplitude or frequency. In one example, the alternating current power source 202 is connected to the output of a step-up converter (not shown) which can be configured to accept variable mains voltage as input (e.g., 110 VAC-265 VAC). In this case, the step-up converter may be configured to increase mains voltage to 400 VDC, or any other suitable voltage level that is reliably higher than the maximum expected mains voltage level (e.g., 265 VAC).

In other examples, the alternating current power source 202 can be implemented in another way. For example, the alternating current power source 202 can be a receiving element (or more than one receiving element) of a wireless power transfer system. More specifically, a wireless power transfer system may be implemented as an inductive or resonant power transfer system with a transmit coil (e.g., transmitting element) and a receive coil (e.g., receiving element) that, when positioned in proximity of one another, form a primary coil and a secondary coil of an air-gap transformer. When power transfers from the primary coil to the secondary coil, the secondary coil outputs alternating current.

However, for simplicity of illustration and description, the embodiments that follow are described in reference to an alternating current power source 202 configured to output high voltage alternating current, such as 90 VAC or 265 VAC, although as noted with respect to some embodiments described herein (e.g., wireless power transfer embodiments), any suitable alternating current power source can be stepped down or otherwise adjusted using the techniques, methods, and circuit topologies described below.

The power converter 200 can include multiple distinct and interconnected circuits or blocks, such as, but not limited to: a rectifier 204, a step-down voltage converter 206, and a low voltage output 208 (which may be coupled to a compensation network). In some cases, the power converter 200 can also include or be associated with one or more of a processor, memory, sensors, digital and/or analog circuits for performing and/or coordinating tasks of the power converter 200. For simplicity of illustration and description, the power converter 200 is depicted in FIG. 2 without many of these elements.

The rectifier 204 of the power converter 200 receives alternating current from the alternating current power source 202 and rectifies the received current into a rippled direct current. The rectifier 204 can be a half-bridge rectifier, although in many embodiments a full-bridge rectifier is used. In many cases, a filter can be added in parallel to the output of the rectifier to further smooth the rippled direct current waveform. The filter can be any suitable low-pass filter (e.g., a capacitor or capacitor network parallel to the output of the rectifier or an inductor-capacitor choke or filter). The rectifier 204 can be implemented in any number of suitable ways. For example, the rectifier 204 can be a synchronous or asynchronous rectifier. For embodiments in which the alternating current power source 202 outputs ~265 VAC, the rectifier 204 outputs rippled direct current having an average bias of (up to or beyond) 400 VDC.

The step-down voltage converter 206 of the power converter 200 receives the rippled direct current from the rectifier 204. In many embodiments, the step-down voltage converter 206 is implemented with a buck converter topology.

In one example, a buck converter can include a tank inductor and an output capacitor. A low-side lead of the tank inductor is coupled to a high-side lead of the output capacitor, which, in turn, is connected to a high-side output lead of the buck converter. The output leads of the buck converter are typically connected to a load. In many cases, a compensation network or other regulator is positioned between the output leads of the buck converter and the input leads of the load. The compensation network can provide regulation and ripple smoothing to the voltage received by the load. For simplicity of illustration, these components are not shown in FIG. 2.

Returning to the buck converter, a voltage-controlled switch (e.g., a high-side switch) couples the high-side lead of the tank inductor to an input lead of the buck converter. The input lead of the buck converter receives the input voltage, which in the illustrated example is the rippled direct current output from the rectifier 204. The buck converter also includes an additional voltage-controlled switch (e.g., a low-side switch), which couples the high-side lead of the tank inductor to a common ground reference (e.g., a reference signal). The buck converter can be switched between a storage mode and a discharge mode by oppositely toggling the high-side switch and the low-side switch.

When the buck converter is in the storage mode, the high-side switch is closed and a first current loop is defined from the input voltage source, through the tank inductor, and to the load. In this mode, voltage across the tank inductor sharply increases to a voltage level equal to the difference between the voltage across the load and the input voltage. This voltage across the tank inductor induces current through the tank inductor to linearly increase. As a result of the topology of the circuit, the current flowing through the tank inductor also flows to the output capacitor and to the load.

Alternatively, when the buck converter transitions to the discharge mode, the high-side switch is opened and a second current loop is defined through the low-side switch. In this mode, voltage across the tank inductor sharply decreases to a voltage level equal to the difference between the voltage across the output leads of the buck converter and reference ground. This voltage across the tank inductor is lower than when in the storage mode, so current within the tank inductor linearly decreases in magnitude. The decreasing current flowing through the tank inductor also flows to the output capacitor and to the load connected across the output leads of the buck converter. In this manner, the output capacitor functions as a low-pass filter, generally reducing ripple in the voltage delivered from the output of the buck converter to the load.

The buck converter can be efficiently operated by switching between the storage mode and the discharge mode by toggling the voltage-controlled switch at a duty cycle selected based on the desired output voltage. The voltage output from the buck converter is proportionately related to the input voltage by the duty cycle. This relationship can be modeled by Equation 1:

$$D_{cycle} = \frac{V_{out}}{V_{in}} \qquad \text{Equation 1}$$

In one example, if direct current output from the rectifier 204 is 400 VDC and the desired output voltage is 50 VDC, a duty cycle of 12.5% may be selected.

In still further embodiments, the step-down voltage converter 206 can be implemented in another manner; it is appreciated that the example topology described above is merely one example of a suitable or appropriate step-down voltage converter.

In many examples, the output of the step-down voltage converter 206 of the power converter 200 is a rippled direct current having a voltage defined by the duty cycle at which the step-down voltage converter 206 is operated. In many cases, the rippled direct current may not be preferred. As such, a compensation network (or other voltage regulator) may be positioned between the output of the step-down voltage converter 206 and the low voltage output 208 to the load. The compensation network can be configured to reduce ripple within the voltage output from the step-down voltage converter 206 and, additionally, provide feedback to a shunt voltage regulator coupled to the step-down voltage converter 206 so that the duty cycle of the step-down voltage converter 206 can be adjusted in real-time.

In many embodiments, the power converter 200 can incorporate a low-side controller (not shown) that is configured to control the conduction state of the low-side switch and adjust the storage mode timing of the step-down voltage converter 206. More specifically, the low-side controller monitors current through the low-side switch (see, e.g., FIG. 3) during the discharge mode. During the discharge mode, the low-side controller detects when current begins to conduct through a body diode of the low-side switch and also through the tank inductor. Thus, the low-side controller can trigger a turn-on of the low-side switch to reduce voltage loss across the body diode. Once current through the low-side switch, and thus the tank inductor, reaches zero, the low-side controller can trigger a turn-off of the low-side switch.

The power converter 200 also incorporates a high-side controller (not shown) that is configured to adjust the discharge mode timing of the step-down voltage converter 206. More specifically, the high-side controller typically operates to synchronously or near-synchronously trigger a turn-on of the high-side switch when the low-side switch is not conducting. The high-side controller can also provide peak-current control to the power converter 200.

The high-side controller monitors current through the high-side switch (see, e.g., FIG. 3) during the storage mode. Once current through the high-side switch, and thus the tank inductor, crosses a threshold, the high-side controller can trigger a turn-off of the high-side switch (e.g., a current control loop). In other cases, the high-side controller can turn on or turn off the high-side switch in response to feedback from a compensation network (e.g., a voltage control loop).

FIG. 3 depicts a simplified system diagram of another example power converter, identified as the power converter 300. The power converter 300 can include multiple distinct and interconnected circuits or blocks, such as, but not limited to: a voltage level controller 304, a compensation network or regulator (identified as the compensation network 306), a high-side controller 318, and a low-side controller 320. As with some embodiments described herein, the power converter 300 can also include or be associated with one or more of a processor, memory, sensors, and digital and/or analog circuits for performing and/or coordinating tasks of the power converter 300. For simplicity of illustration and description, the power converter 300 is depicted in FIG. 3 without many of these elements. Further, while the high-side controller 318 and low-side controller 320 are illustrated as separate components, in some embodiments the high-side controller 318 and low-side controller 320 may be implemented in a single component.

The voltage level controller 304 of the power converter 300 receives the rippled direct current from a rippled direct current source 302. In many embodiments, the voltage level controller 304 is implemented with a buck converter topology. For example, a buck converter includes a high-side MOSFET 310, which couples the rippled direct current source 302 to a high-side lead of a tank inductor 312. The low-side lead of the tank inductor 312 is coupled to the high-side lead of an output capacitor 314. The output capacitor 314, in turn, is coupled to the load 308 via the compensation network 306. The high-side MOSFET 310 accordingly defines a first current path through the tank inductor to the load when the buck converter is in a storage mode.

A low-side MOSFET 316 defines a second current path through the tank inductor 312 to the load 308 when the buck converter is in a discharge mode. The low-side MOSFET 316 can be used to couple the high-side lead of the tank inductor 312 to a ground reference (e.g., a reference signal) of the buck converter.

The voltage level controller 304, implemented as a buck converter, can be switched between a storage mode and a discharge mode by toggling the high-side MOSFET 310 and the low-side MOSFET 316. More specifically, when the voltage level controller 304 is in the storage mode, the high-side MOSFET 310 is closed and the low-side MOSFET 316 is opened, defining a first current loop from the rippled direct current source 302, through the tank inductor 312, and to the load 308. In this mode, voltage across the tank inductor 312 sharply increases to a voltage level equal to the difference between the voltage across the load 308 and the input voltage. This voltage across the tank inductor 312 induces current through the tank inductor 312 to linearly increase. As a result of the topology of the circuit, the current flowing through the tank inductor 312 also flows to the output capacitor 314 and to the load 308.

Alternatively, when the voltage level controller 304 transitions to the discharge mode, the high-side MOSFET 310 is opened and the low-side MOSFET 316 is closed, defining a second current loop through the low-side MOSFET 316, through the tank inductor 312, and to the load 308. In this mode, voltage across the tank inductor 312 sharply decreases to a voltage level equal to the difference between the voltage across the load 308 and reference ground. This voltage across the tank inductor 312 is accordingly negative when compared to the positive voltage of the storage mode, so current within the tank inductor 312 linearly decreases in magnitude. The decreasing current flowing through the tank inductor 312 also flows to the output capacitor 314 and to the load 308 connected across the output leads of the voltage level controller 304. In this manner, the output capacitor 314 functions as a low-pass filter, generally reducing ripple in the voltage delivered from the output of the voltage level controller 304 to the load 308. The compensation network 306 further reduces remaining ripple in the voltage signal.

As noted with respect to some embodiments described herein, the voltage level controller 304 can be efficiently operated by switching between the storage mode and the discharge mode by toggling the high-side MOSFET 310 and/or the low-side MOSFET 316 at a duty cycle selected based on the desired output voltage. The high-side MOSFET 310 can be controlled by drive circuitry 322, which may be incorporated into a high-side controller 318. The drive circuitry 322 is configured to selectively apply a voltage to the gate of the high-side MOSFET 310 to toggle the discharge mode of the voltage level controller 304. The low-side MOSFET 316 can be controlled by additional drive circuitry 328, which may be incorporated into a low-side controller 320. The drive circuitry 328 is configured to selectively apply a voltage to the gate of the low-side MOSFET 316 to toggle the storage mode of the voltage level controller 304.

The high-side MOSFET 310 and the low-side MOSFET 316 can each be associated with a respective diode. The diodes are placed across the respective source and drain of the MOSFETs 310, 316 such that one diode is associated with the high-side MOSFET 310 and one with the low-side MOSFET 316. In some embodiments, the diodes can be discrete and separate elements from the high-side MOSFET 310 and low-side MOSFET 316, although this is not required. For example, in one embodiment the diodes are implemented as body diodes within the high-side MOSFET 310 and low-side MOSFET 316. In other examples, the diodes can be implemented as external diodes.

In many examples, a body diode is incorporated within the low-side MOSFET 316. When the voltage level controller 304 begins to enter the discharge mode, the high-side MOSFET 310 may be turned off. Once the high-side MOSFET 310 is off, current may begin flowing through the body diode of the low-side MOSFET 316. The voltage across the low-side MOSFET 316 may increase rapidly when the diode begins conducting current. This voltage may be measured in order to control the turn-on timing of the low-side MOSFET 316.

The power converter 300 incorporates a high-side controller 318 that is configured to adjust the discharge mode timing of the voltage level controller 304 by controlling a time at which the drive circuitry 322 is disabled. More specifically, the high-side controller 318 typically monitors a current through the high-side MOSFET 310 and the tank inductor 312. The high-side controller 318 may include peak current detection circuitry 324, which is configured to monitor for a given peak current through the tank inductor 312. When the peak current is reached, the high-side controller 318 may cause the drive circuitry 322 to trigger a discharge mode of the voltage level controller 304.

During the discharge mode, the high-side MOSFET 310 may be opened while the low-side MOSFET 316 is closed. The synchronous or near-synchronous switching of both MOSFETs may reduce power losses typical in circuits incorporating a diode in the place of the low-side MOSFET 316. The low-side MOSFET 316 may be near-synchronously switched with the high-side MOSFET 310 by closing the low-side MOSFET 316 after the high-side MOSFET 310 has ceased conducting and current begins to flow through the body diode of the low-side MOSFET 316.

More specifically, during the storage mode of the voltage level controller 304, a resistor may be connected in series between the high-side MOSFET 310 and the tank inductor 312. During the storage mode the high-side MOSFET 310 is closed, and current through the tank inductor 312 increases linearly. As the current through the inductor increases, a voltage measured across the resistor can increase. The peak current detection circuitry 324 within the high-side controller 318 can measure the voltage across the resistor to determine the current through the tank inductor 312. The detected voltage signal across the resister can be used to control the drive circuitry 322 and control the turn-off timing of the high-side MOSFET 310. In this manner, generally and broadly, the high-side controller 318 can be used to facilitate peak current and/or peak voltage switching of the high-side MOSFET 310.

The power converter 300 further incorporates a low-side controller 320 that is configured to turn on the low-side MOSFET 316 during the discharge mode and adjust the storage mode timing of the voltage level controller 304. The low-side controller 320 may do this by controlling a time at which the drive circuitry 328 is enabled and disabled, respectively. More specifically, the low-side controller 320 typically monitors a voltage across the low-side MOSFET 316 to detect a current through the tank inductor 312. The low-side controller 320 may include current detection circuitry 326, which is configured to monitor for a zero-current condition through the tank inductor 312. When current begins to flow through the body diode of the low-side MOSFET 316 during the discharge mode, the low-side controller 320 may detect a voltage (or voltage change) across the low-side MOSFET 316 and cause the drive circuitry 322 to trigger a turn-on of the low-side MOSFET 316, thereby reducing conduction losses through the body diode.

When the current through the low-side MOSFET 316 reaches zero amps, the low-side controller 320 may cause the drive circuitry 322 to trigger a storage mode of the voltage level controller 304 by turning off the low-side MOSFET 316. In some embodiments, there may be a delay between the current reaching zero amps and the triggering of the storage mode. During the storage mode the high-side MOSFET 310 may be closed while the low-side MOSFET 316 is opened. In many cases, the low-side MOSFET 316 is opened when the low-side controller 320 detects a zero current condition, while the high-side MOSFET 310 may be closed after a delay.

More specifically, during the discharge mode of the voltage level controller 304, a resistor may be coupled in parallel with the low-side MOSFET 316 and in series with an auxiliary MOSFET (which is shown as element 420 in FIG. 4) and the tank inductor 312. Since this resistor is inserted into a parallel current path through the tank inductor 312, when the body diode of the low-side MOSFET 316 begins conducting, current through the low-side MOSFET 316 can be measured as a voltage across the parallel resistor (barring any relatively negligible voltage loss across the auxiliary MOSFET). This voltage signal can be used to control the turn-on timing of the low-side MOSFET 316. In this manner, generally and broadly, the low-side controller 320 can be used to reduce or minimize the power loss caused by the voltage drop of the body diode conduction of the low-side MOSFET 316 before the low side MOSFET 316 is turned on which, in turn, can reduce dynamic conduction losses.

The voltage across the resistor that is in parallel with the low-side MOSFET 316 can also be used to control the turn-off timing of the low-side MOSFET 316 as current through the tank inductor 312 decreases, which causes the voltage across the resistor to decrease. In this manner, generally and broadly, the low-side controller 320 can be used to facilitate zero-current and/or zero-voltage switching (or near-zero current and/or voltage switching) of the voltage level controller 304 which may further reduce dynamic switching losses.

In many cases, the power converter is configured to reduce a relatively high voltage to a low voltage, such that the voltage level controller 304 is operated a majority of a duty cycle in the discharge mode. In these cases, the resistor by which current is measured may have a high resistance level such that, when the resistor is connected in parallel with the low-side MOSFET 316 current detection power losses are minimized.

Additional control circuitry may interconnect the high-side controller 318 and the low-side controller 320 in order to facilitate synchronous or near-synchronous operation of the high-side MOSFET 310 and the low-side MOSFET 316. In some embodiments, an inverter control may interconnect the high-side controller 318 and the low-side controller 320 such that when the high-side MOSFET 310 is opened, the low-side MOSFET 316 is closed, and vice versa. In other embodiments, additional circuitry, such as a delay between the turn-off of the low-side MOSFET 316 and the turn-on of the high-side MOSFET 310, may be implemented as appropriate.

The foregoing embodiments depicted in FIGS. 2-3 and the various alternatives thereof and variations thereto are presented, generally, for purposes of explanation, and to facilitate a thorough understanding of various possible configurations and circuit topologies of a power converter that incorporates a high-side controller and a low-side controller that facilitate efficient synchronous or near synchronous operation. However, it will be apparent to one skilled in the art that some of the specific details presented herein may not be required in order to practice a particular described embodiment, or an equivalent thereof.

Figure 4:
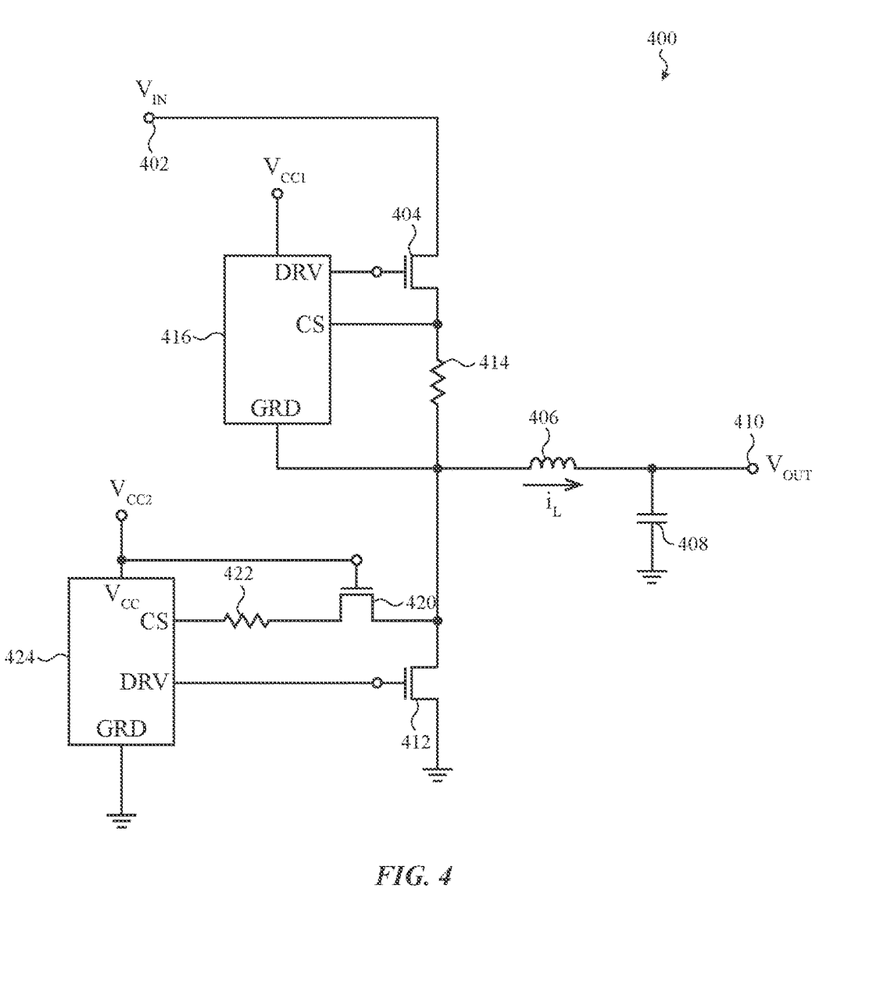
FIG. 4 is a simplified schematic diagram of a power converter incorporating a buck converter, a high-side controller, and a low-side controller, such as described herein.

Generally and broadly, FIG. 4 depicts a simplified schematic diagram of an example power converter, which may incorporate a buck converter (e.g., a voltage level controller) as described herein. In particular, the power converter 400 is configured to receive rippled high-voltage DC and configured to output reduced voltage DC. The power converter 400 can include a low-side controller 424 that assists in timing the conduction mode of a low-side MOSFET 412 and the storage mode timing of the buck converter. The power converter 400 can also include a high-side controller 416 that assists in timing the discharge mode of the buck converter. In some embodiments, the high-side controller can facilitate timing the storage mode of the buck converter, or both modes. It should be appreciated that discussions herein relating to timing or affecting a "discharge" mode may be readily configured to timing or affecting a "storage" mode. Accordingly, embodiments herein that discuss controlling timing of a discharge mode are meant to encompass controlling timing of a storage mode, and vice versa.

The low-side controller 424 and high-side controller 416 may be operated in a synchronous or near-synchronous manner to reduce conduction losses. The output of the power converter 400 can be regulated by a compensation/feedback network (not shown) at positive output terminal $V_{OUT}$ 410. Feedback received from the compensation/feedback network can be implemented as additional control to the low-side controller 424 and/or the high-side controller 416.

As with other power converters described herein, the power converter 400 is implemented with a buck converter that includes an output capacitor 408 and a tank inductor 406. In this topology, the low-side lead of the tank inductor 406 is coupled to a high-side lead of the output capacitor 408, which, in turn, is connected to a positive output terminal 410 ($V_{OUT}$) of the buck converter. The negative output of the buck converter may be a common ground reference.

A high-side MOSFET 404 can be used to couple a high-side lead of the tank inductor 406 to a positive input terminal 402 to the power converter 400. The high-side MOSFET 404 defines a first current path from the positive input terminal 402, through the tank inductor 406, and to the positive output terminal 410 when the buck converter is in a storage mode.

A low-side MOSFET 412 couples a high-side lead of the tank inductor 406 to a common ground reference (e.g., a reference signal). The low-side MOSFET 412 defines a second current path from the ground reference, through the tank inductor 406, and to the positive output terminal 410 when the buck converter is in a discharge mode.

The buck converter can be switched between a storage mode and a discharge mode by toggling the high-side MOSFET 404 and/or the low-side MOSFET 412. More specifically, when the buck converter is in the storage mode, the high-side MOSFET 404 is closed while the low-side MOSFET 412 is opened, and a first current loop is defined from the positive input terminal 402, through the tank inductor 406, to the positive output terminal 410.

In the storage mode, voltage across the tank inductor 406 sharply increases to a positive voltage level equal to the difference between the voltage across the output capacitor 408 and the input voltage $V_{IN}$. This voltage across the tank inductor 406 induces current $i_L$ through the tank inductor 406 to linearly increase. As a result of the topology of the circuit, the current $i_L$ flowing through the tank inductor 406 also flows to the output capacitor 408 and to the positive output terminal 410.

When the buck converter transitions to the discharge mode, the high-side MOSFET 404 is opened while the low-side MOSFET 412 is closed, and a second current loop is defined through the low-side MOSFET 412. In this mode, voltage across the tank inductor 406 sharply decreases to a voltage level equal to the voltage across the output capacitor 408. This voltage across the tank inductor 406 is accordingly negative when compared to the positive voltage of the storage mode, so the current $i_L$ within the tank inductor 406 linearly decreases in magnitude. The decreasing current $i_L$ flowing through the tank inductor 406 also flows to the output capacitor 408 and to the positive output terminal 410 of the power converter 400. In this manner, the output capacitor 408 functions as a low-pass filter, generally reducing ripple in the voltage delivered from the output of the buck converter to the positive output terminal 410 of the power converter 400.

More particularly, as noted with respect to some embodiments described herein, the buck converter can be efficiently operated by switching between the storage mode and the discharge mode by toggling the gate voltage of the high-side MOSFET 404 and/or the low-side MOSFET 412 at a duty cycle selected based on the desired output voltage. More specifically, increasing the voltage at the gate of the high-side MOSFET 404 can cause the high-side MOSFET 404 to conduct current, and increasing the voltage at the gate of the low-side MOSFET 412 can cause the low-side MOSFET 412 to conduct current.

The buck converter can be toggled from the storage mode to the discharge mode in a manner that is responsive to changes in impedance of a load. More particularly, the power converter 400 can include a feedback controller (not shown). The feedback controller may monitor the output voltage $V_{OUT}$ of the power converter 400 implementing the buck converter. If the output voltage of the power converter 400 drops, the feedback controller may compensate for the voltage drop by increasing the per-cycle on-time of the high-side MOSFET 404. In this manner, the output voltage of the power converter 400 can be regulated independent of the load current and independent of the input voltage.

The output of the power converter 400 can further be coupled to a compensation network and/or a regulation network (not shown) in order to regulate $V_{OUT}$ against any load variation. The compensation network can be formed in any number of suitable ways to provide stable operation of the voltage output from the power converter 400 and to provide an isolated node suitable for providing feedback to the feedback controller.

In many cases, the power converter 400 incorporates a high-side controller 416 that is configured to adjust the discharge mode timing of the buck converter by controlling a time at which the low-side MOSFET 412 and/or the high-side MOSFET 404 is toggled.

More specifically, the high-side controller 416 typically monitors a voltage across a resistor 414 coupled in series between the high-side MOSFET 404 and the tank inductor 406. When the buck converter is in the storage mode, the high-side MOSFET 404 is closed, while the low-side MOSFET 412 is opened, creating a first current loop through the resistor 414 and the tank inductor 406. As the resistor 414 is coupled in series with the tank inductor 406, the current through the tank inductor $i_L$ may be measured by the high-side controller 416 as a voltage across the resistor 414.

In this manner, the measurement of voltage across the resistor 414 is configured to directly detect a given peak current through the tank inductor 406. As noted above, once current through the resistor 414, and thus the tank inductor 406, reaches the given peak value, the high-side controller 416 can trigger a turn-off of the high-side MOSFET 404. The high-side controller 416 can trigger a turn-off of the high-side MOSFET 404 by lowering the voltage at the gate of the high-side MOSFET 404. The low-side controller 424 may synchronously or near-synchronously trigger a turn-on of the low-side MOSFET 412 (e.g., via a signal causing the low-side controller 424 to increase the gate voltage of the low-side MOSFET 412). Accordingly, the high-side controller 416 triggers the buck converter to change to a discharge mode.

The low-side MOSFET 412 may be near-synchronously switched with the high-side MOSFET 404 by causing a turn-on of the low-side MOSFET 412. This may be done by increasing the gate voltage of the low-side MOSFET 412 after the high-side MOSFET 404 has ceased conducting and/or current begins to flow through the body diode of the low-side MOSFET 412. By synchronously or near-synchronously switching the high-side MOSFET 404 and the low-side MOSFET 412, the power converter 400 may reduce switching losses due to cut-in voltages and/or delays in topologies incorporating a return diode in place of the low-side MOSFET 412.

The power converter 400 further incorporates a low-side controller 424 that is configured to optimize or otherwise facilitate the turn-on timing of the low-side MOSFET 412 and adjust the storage timing of the buck converter by controlling a time at which the low-side MOSFET 412 and/or the high-side MOSFET 404 is toggled.

More specifically, the low-side controller 424, through the auxiliary MOSFET 420 and series resistor 422, typically monitors a voltage across the low side MOSFET 412. The auxiliary MOSFET 420 and the resistor 422 are coupled in parallel with the low-side MOSFET 412. Generally, the gate of the auxiliary MOSFET 420 is biased with a fixed low voltage VCC2, as shown in FIG. 4. When the low-side MOSFET 412 is conducting during the discharge mode, the drain voltage and source voltage of the auxiliary MOSFET 420 become zero (or near-zero), and the auxiliary MOSFET 420 begins conducting as well.

Once the low-side MOSFET 412 is turned off during the storage mode, the drain voltage of the low-side MOSFET 412 becomes high, causing the drain voltage of the auxiliary MOSFET 420 to increase and become high as well. Accordingly, the gate to source voltage of the auxiliary MOSFET 420 falls below the gate threshold voltage level, causing the auxiliary MOSFET 420 to turn off and cease conducting.

When the low side MOSFET 412 begins conducting (e.g., the body diode of the low-side MOSFET 412 begins conducting), the auxiliary MOSFET is closed as well, coupling the resistor 422 to the tank inductor 406 in an auxiliary current loop. As current is conducted through the low-side MOSFET 412, a small parallel current is induced in the auxiliary current loop through the resistor 422. The current of the auxiliary current loop through the resistor 422 may be measured by the low-side controller 424 as a voltage across the resistor 422. The current measured through the resistor 422 is thus proportional to the current in the second current loop through the tank inductor 406. The resistance value of the resistor 422 may be selected as appropriate to adjust the current sensing amplitude measured at the low-side controller 424.

As the buck converter completes a transition to the discharge mode, the low-side controller 424 detects a voltage across the low-side MOSFET 412. The low-side voltage controller 424 then increases the gate voltage of the low-side MOSFET 412, closing the low-side MOSFET 412 and reducing the conduction loss due to the body diode. The low-side MOSFET 412 then permits current flow through the tank inductor 406 and to the positive output terminal 410 of the power converter 400.

In this manner, the measurement of voltage across the resistor 422 is also configured to indirectly detect zero or near-zero current through the tank inductor 406. As noted above, once current through the resistor 422, and thus the tank inductor 406, reaches zero amps, the low-side controller 424 can trigger a turn-off of the low-side MOSFET 412. The low-side controller 424 can trigger a turn-off of the low-side MOSFET 412 by lowering the voltage at the gate of the low-side MOSFET 412. The low-side controller 424 may synchronously or sequentially trigger a turn-on of the high-side MOSFET 404 (e.g., via a signal to the high-side controller 416). In some embodiments, the turn-on of the high-side MOSFET 404 may be delayed after a detected zero-voltage or near-zero voltage condition. Once the high-side MOSFET 404 is turned on, a voltage at the high-side lead of the tank inductor 406 can cause a turn-off of the auxiliary MOSFET 420.

In many cases, the power converter 400 is configured to convert a relatively high voltage to a low voltage, such that the buck converter is operated a majority of each duty cycle in the discharge mode. In these cases, reducing the voltage stress of the low-side controller 424 from the high-side lead of the tank inductor may allow a low voltage controller to be used in high voltage conversion.

The foregoing embodiment depicted in FIG. 4 and the various alternatives thereof and variations thereto are presented, generally, for purposes of explanation, and to facilitate a thorough understanding of various possible configurations of circuits that may be used to implement a power converter such as described herein. However, it will be apparent to one skilled in the art that some of the specific details presented herein may not be required in order to practice a particular described embodiment, or an equivalent thereof.

Figure 5:
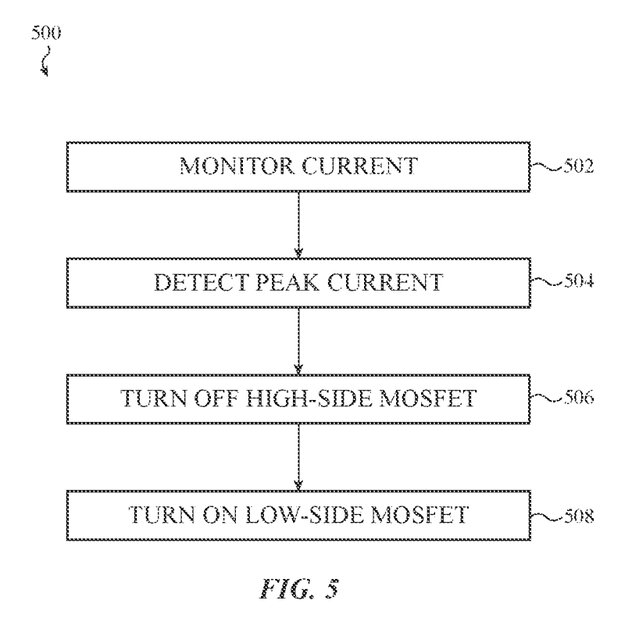
FIG. 5 is a simplified flow chart depicting a method of operating a low-side controller, such as described herein.

FIG. 5 is a simplified flow chart depicting example operations of a method of operating a high-side controller such as described herein. The method depicted can, in some embodiments, be performed (at least in part) by one or more portions of a power converter such as depicted in FIG. 4. In other cases, the method is performed by another processor or circuit, or combination of processors or circuits.

The method 500 begins at operation 502 in which a current is monitored through a tank inductor of a buck converter. In some cases, a resistor can be positioned in series with the tank inductor. Current through the resistor is the same as current through the tank inductor, and can be measured as a voltage across the resistor. In other cases, a different current can be measured. For example, current can be measured by an inductor or Hall effect sensor positioned around or adjacent a conductor, such as a lead or trace associated with a buck converter of a power converter. Accordingly, it may be appreciated that a current through the tank inductor can be measured or obtained in any number of suitable ways.

Next, at operation 504, a peak current is detected. In some cases, the peak current may be a fixed threshold value. In other cases, the peak current may be a variable threshold value. In cases where the threshold value is variable, it may be set according to feedback values generated in other processes and/or components of the power converter.

At operation 506, a high-side MOSFET of the buck converter is turned off. The high-side MOSFET may be turned off by lowering a voltage applied at the gate of the high-side MOSFET. Lastly, at operation 508, a low-side MOSFET of the buck converter is turned on. In many cases, the low-side MOSFET of the buck converter is turned on synchronously or near-synchronously with the turn-off of the high-side MOSFET. The low-side MOSFET may be turned on in response to detecting that a body diode of the low-side MOSFET begins to conduct.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Figure 6:
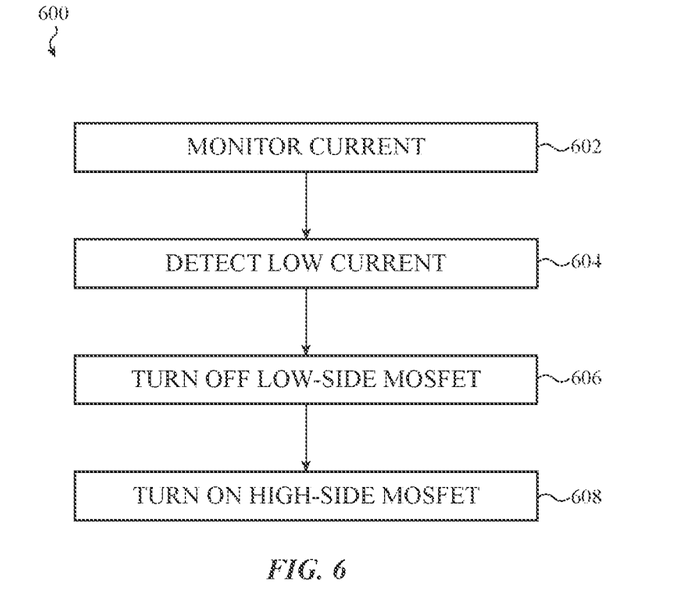
FIG. 6 is a simplified flow chart depicting a method of operating a high-side controller, such as described herein.

FIG. 6 is a simplified flow chart depicting example operations of a method of operating a low-side controller such as described herein. The method depicted can, in some embodiments, be performed (at least in part) by one or more portions of a power converter such as depicted in FIG. 4. In other cases, the method is performed by another processor or circuit, or combination of processors or circuits.

The method 600 begins at operation 602, in which a current is monitored through a tank inductor of a buck converter. In some cases, a resistor can be positioned in parallel to a low-side MOSFET conducting current through the tank inductor. Current through the resistor is proportional to current through the tank inductor, and can be measured as a voltage across the resistor. In other cases, a different current can be measured. For example, current can be measured by an inductor or Hall effect sensor positioned around or adjacent a conductor, such as a lead or trace associated with a buck converter of a power converter. Accordingly, it may be appreciated that a current through the tank inductor can be measured or obtained in any number of suitable ways.

Next, at operation 604, a zero-current or zero crossing of current is detected. At operation 606, a low-side MOSFET of the buck converter is turned off. The low-side MOSFET may be turned off by lowering a voltage applied at the gate of the low-side MOSFET.

Lastly, at operation 508, a high-side MOSFET of the buck converter is turned on. In some cases, the high-side MOSFET of the buck converter is turned on synchronously with the turn-off of the low-side MOSFET. In other cases, the high-side MOSFET is turned on after a delay. The delay can be based on a characteristic associated with the power converter and/or a detected state or pattern of the current through the tank inductor.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A step-down voltage converter comprising:
    a tank inductor;
    an output capacitor in series with the tank inductor;
    a first voltage-controlled switch in series with the tank inductor and an input signal;
    a second voltage-controlled switch in series with the tank inductor and a reference signal; and
    a low-side controller operably connected to the second voltage-controlled switch and configured to detect a current associated with the second voltage-controlled switch; wherein
        the low-side controller is configured to open the second voltage-controlled switch in response to the current crossing a threshold.

2. The step-down voltage converter of claim 1, wherein:
    the current is a first current;
    the threshold is a first threshold;
    the step-down voltage converter further comprises a high-side controller operably connected to the first voltage-controlled switch and configured to detect a second current associated with the first voltage-controlled switch; and
    the high-side controller is configured to open the first voltage-controlled switch in response to the second current crossing a second threshold.

3. The step-down voltage converter of claim 2, further comprising:
    a first resistor connected in series between the first voltage-controlled switch and the tank inductor;
    a second resistor connected in parallel with the second voltage-controlled switch; wherein
        the second current is detected by measuring a first voltage across the first resistor; and
        the first current is detected by measuring a second voltage across the second resistor.

4. The step-down voltage converter of claim 2, wherein the low-side controller is configured to close the second voltage-controlled switch upon measuring the second voltage exceeding a voltage threshold.

5. The step-down voltage converter of claim 2, wherein the high-side controller is configured to close the first voltage-controlled switch substantially synchronously with the low-side controller opening the second voltage-controlled switch.

6. The step-down voltage converter of claim 2, wherein the high-side controller is configured to close the first voltage-controlled switch a delayed time after the low-side controller opens the second voltage-controlled switch.

7. The step-down voltage converter of claim 1, further comprising a third voltage-controlled switch in series with a resistor, the third voltage controlled switch and the resistor coupled parallel to the second voltage-controlled switch; wherein
    the low-side controller is configured to detect the current as a voltage across the resistor.

8. The step-down voltage converter of claim 7, wherein:
    the third voltage-controlled switch comprises a MOSFET; and
    the third voltage-controlled switch is biased with a gate voltage level sufficient to cause the third voltage-controlled switch to close substantially synchronously with the first voltage-controlled switch opening and to cause the third voltage-controlled switch to open substantially synchronously with the first voltage-controlled switch closing.

9. The step-down voltage converter of claim 7, wherein the low-side controller is configured to close the second voltage-controlled switch upon measuring the voltage exceeding a voltage threshold.

10. A power converter within a housing of an electronic device, the power converter comprising:
 a buck converter comprising:
  a high-side MOSFET connected in series with a tank inductor forming a first current loop in a storage mode;
  a low-side MOSFET connected in series with the tank inductor forming a second current loop in a discharge mode;
 a first current monitoring circuit associated with a first current through the tank inductor during the storage mode;
 a second current monitoring circuit associated with a second current through the tank inductor during the discharge mode; and
 a high-side controller configured to decrease a gate voltage of the high-side MOSFET below a switching threshold of the high-side MOSFET, when a first voltage output from the first current monitoring circuit exceeds a first predetermined threshold.

11. The power converter of claim 10, further comprising a low-side controller configured to decrease a gate voltage of the low-side MOSFET below a switching threshold of the low-side MOSFET, when a second voltage output from the second current monitoring circuit drops below a second predetermined threshold.

12. The power converter of claim 11, wherein the low-side controller is further configured to increase the gate voltage of the low-side MOSFET above the switching threshold of the low-side MOSFET, when the second voltage output from the second current monitoring circuit exceeds a third predetermined threshold.

13. The power converter of claim 11, wherein the high-side controller is further configured to increase the gate voltage of the high-side MOSFET above the switching threshold of the high-side MOSFET, substantially synchronously, when the low-side controller decreases the gate voltage of the low-side MOSFET below the switching threshold of the low-side MOSFET.

14. The power converter of claim 11, wherein the high-side controller is further configured to increase the gate voltage of the high-side MOSFET above the switching threshold of the high-side MOSFET, after a predetermined delay, when the second voltage output from the second current monitoring circuit drops below the second predetermined threshold.

15. The power converter of claim 10, wherein the high-side MOSFET is coupled to an input signal to the buck converter.

16. The power converter of claim 10, wherein the first current monitoring circuit comprises a resistor connected in series between the tank inductor and the high-side MOSFET.

17. The power converter of claim 10, wherein the second current monitoring circuit comprises a resistor and an auxiliary MOSFET connected in parallel with the low-side MOSFET.

18. A method of reducing voltage in a power converter, the method comprising:
 receiving a voltage at an input of a buck converter comprising a tank inductor and a high-side switch;
 monitoring current through the tank inductor;
 upon determining that the current through the tank inductor has reached a predetermined value, opening the high-side switch; and
 after opening the high-side switch and upon determining that current through the tank inductor exceeds zero, closing a low-side switch; wherein
  the opening of the high-side switch disconnects the input from the tank inductor; and
  the closing of the low-side switch passes current through the tank inductor.

19. The method of claim 18, further comprising:
 upon determining that the current through the tank inductor has dropped to zero, opening the low-side switch; and
 upon opening the low-side switch, closing the high-side switch; wherein
  the closing of the high-side switch connects the input to the tank inductor.

20. The method of claim 18, further comprising:
 upon determining that the current through the tank inductor has dropped to zero, opening the low-side switch and initiating a predetermined delay; and
 after the predetermined delay, closing the high-side switch to connect the input to the tank inductor.

* * * * *